United States Patent [19]

Rutman

[11] 3,845,396

[45] Oct. 29, 1974

[54] DEVICE FOR MULTIPLYING A FREQUENCY INCREMENT

[75] Inventor: Jacques Rutman, Fontenay Aux Roses, France

[73] Assignee: Adret-Electronique, Trappes, France

[22] Filed: Dec. 27, 1972

[21] Appl. No.: 318,922

[30] Foreign Application Priority Data

July 25, 1972 France .............................. 72.26997

[52] U.S. Cl. ...................... 328/15, 307/220, 328/14, 331/53

[51] Int. Cl. ............................................ H03b 19/00

[58] Field of Search ............ 328/14, 15, 16; 331/53; 307/220, 295

[56] References Cited

UNITED STATES PATENTS

| | | | |
|---|---|---|---|
| 2,813,977 | 11/1957 | Carter | 331/53 |
| 2,829,255 | 4/1958 | Bolie | 331/53 |
| 3,551,826 | 12/1970 | Sepe | 331/53 |
| 3,723,898 | 3/1973 | Tewksbury | 328/14 |

*Primary Examiner*—Stanley D. Miller, Jr.
*Attorney, Agent, or Firm*—William Anthony Drucker

[57] ABSTRACT

A device for multiplying a frequency increment, based on the use of several phase-locked loops, each comprising a variable oscillator one or several increment dividers in series. For a given value of the increment multiplication factor, the number of loops and the number of dividers per loop will be selected so as to obtain a predetermined overall time constant. An extra loop can also be added, comprising a synthesizer so as to operate at a programmable frequency.

3 Claims, 2 Drawing Figures

DEVICE FOR MULTIPLYING A FREQUENCY INCREMENT

Figure 1:
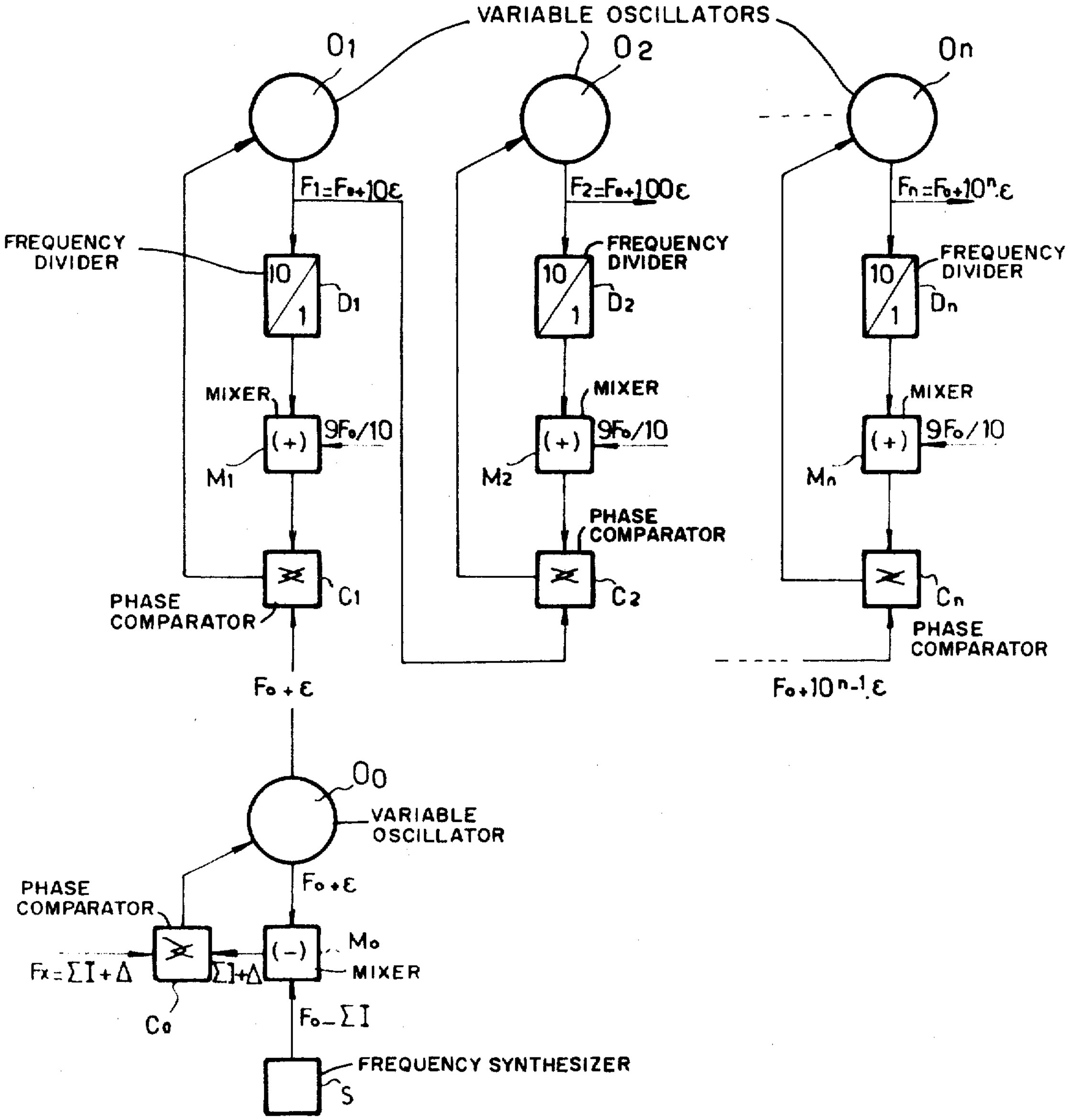

The invention relates to the measurement of a frequency comprising a constant term $F_0$ and a variable increment $\epsilon$.

To make such a measurement, the use of increment-multiplying devices is known. The simplest comprises a multiplier-by-10 of the frequency $F_0 + \epsilon$, a multiplier-by-9 of the constant term $F_0$, and a mixer which subtracts the output frequencies from these two multipliers. This simple device has the major disadvantage of only working at a single specific value term $F_0$. Moreover, it cannot operate when the increment $\epsilon$ is not small in relation to the constant term $F_0$.

French Pat. No. 70,2899 filed on July 30, 1970 by Adret Electronique applicant, for: "Active frequency meter" and issued on Feb. 14, 1972, described a device incorporating a frequency-synthesizing iterative chain fitted with an interpolation oscillator and approximately programmed at the frequency to be measured.

The interpolation oscillator is substituted for the local oscillator of one of the decades of the synthesizer obtaining the least significant digits of the number which expresses the frequency to be measured. A phase-locked loop, comprising means for producing the subtractive beat between the frequency to be measured and the synthesizer output frequency and of controlling the frequency of the interpolation oscillator from that beat, thus automatically controls the frequency variation of the interpolation oscillator at the value $\epsilon$. $10^n$, n depending on the rank of the decade in which the interpolation oscillator is working. This device enables the increment to be measured to be multiplied by a coefficient $10^n$ which may reach high values, if a synthesizer comprising a sufficient number of decades is used. It is moreover capable of operating in wide ranges of frequencies.

Nevertheless, it has the disadvantage that it leads to a measurement time which increases with $n$.

It is in fact known that the time constant of a phaselocked loop comprising frequency division by $10^n$ is equal to $10^n/2\ \pi ab$, a and b being coefficients which depend on the phase comparator and the oscillator comprised in the loop, respectively.

The main object of the invention is to provide an increment-multiplying device the time constant of which may be controlled so as to be able to measure more or less rapid variations of the increment.

In accordance with the invention, the device comprises two or several phase locked loops mounted in cascade each of said loop comprising an increment divider and acting as an increment-multiplier.

The overall increment multiplication factor is equal to the product of the multiplication factors supplied by the respective loops, while the overall time constant is $\sqrt{\Sigma\theta_n^2}$, $\theta_1 \ldots \theta_n$ being the time constants of the respective loops.

To obtain the required overall multiplication factor, it is then possible to group a variable number of loops themselves each comprising a variable number of increment dividers. The minimum time constant is obtained when each loop only comprises one increment divider, while the maximum time constant is obtained when all the increment dividers are grouped in the same loop.

A better understanding of the invention will be obtained from the following description.

Figure 2:
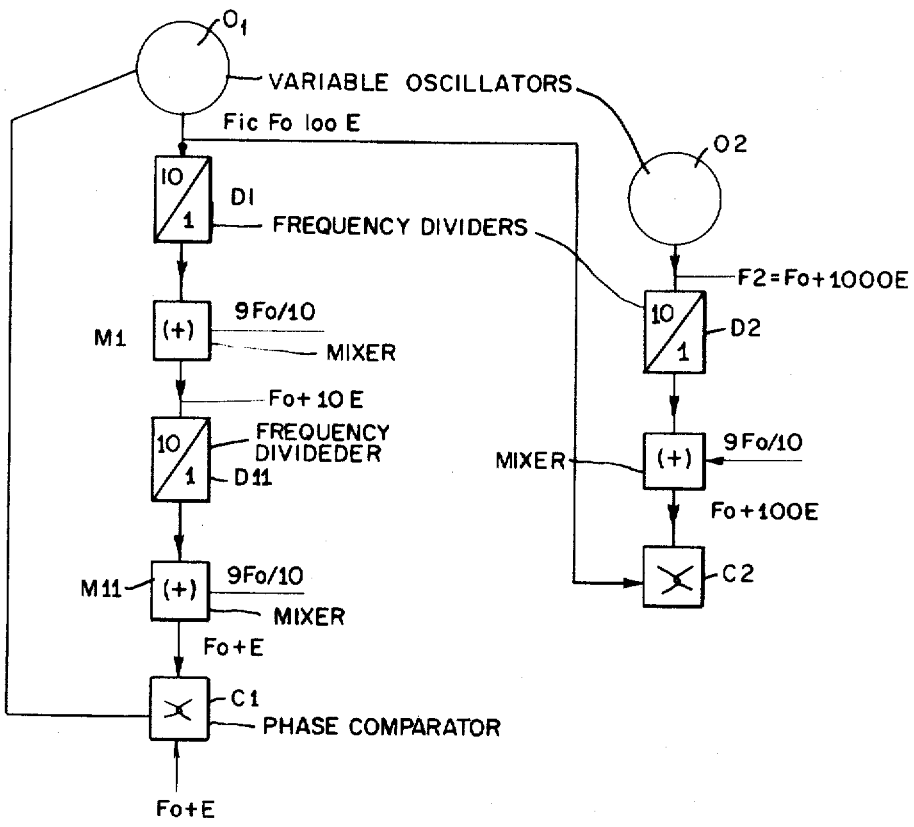

In the attached drawings;

FIG. 1 shows an increment multiplier by $10^n$ comprising, as an example, $n$ phase-locked loops, each including one increment divider, and FIG. 2 shows an increment multiplier by 1,000, comprising two phase locked loops, one of which includes two increment dividers.

Referring now to FIG. 1, each phase locked loop has been shown in the simplified form of a variable oscillator ($0_1, 0_2 \ldots O_n$), followed by a divider-by-10 ($D_1, D_2 \ldots D_n$), itself followed by an additive mixer with a frequency $9F_0/10$ ($M_1, M_2 \ldots M_n$), which drives a phase comparator ($C_1, C_2 \ldots C_n$). The output from each phase comparator drives a component controlling the frequency of the corresponding oscillator. The first comparator receives the frequency $F_0 + \epsilon$ whose increment $\epsilon$ is to be multiplied, and each of the other comparators receives the output frequency from the oscillator of the preceding loop.

The output frequency of $M_1$ is $9F_0/10 + F_1/10$, $F_1$ being the frequency of the oscillator $0_1$. The effect of the loop is to make the two input frequencies of the comparator $C_1$ equal, whence:

$$F_0 + \epsilon = 9F_0/10 + F_1/10$$

or $$F_1 = F_0 + 10\epsilon$$

similarly $$F_2 = F_0 + 100\epsilon \text{ and } F_n = F_0 + 10^N$$

The time constant of each of the loops (assumed to be identical) is $$\theta_o = 10/2\ \pi ab$$

The overall time constant of the device is $$\theta = \sqrt{n} \times \theta_o = 10\ \sqrt{n}/2\pi ab.$$

The overall time constant of a single loop giving the same increment multiplication factor and comprising n increment dividers would be $10^n/2\ \pi a.b.$, i.e., $10^{n-1}/\ \sqrt{n}$ times higher.

If it is wished to obtain intermediate time constants, it is possible to use a number of loops less than $n$, and make each loop comprise two or several increment dividers.

For example, with $n = 6$, the following solutions are available (if the number of oscillators used is limited to two):

1 single loop with 6 increment dividers:
$\theta = 10^6/2\ \pi\ a.b.$ 1 loop with 5 dividers + 1 loop with 1 divider:
$\theta = \sqrt{(10^5/2\ \pi\ a.b.)^2 + (10/2\ \pi\ a.b.)^2}\ \# \ 10^5/2\ \pi\ a.b.$ 1 loop with 4 dividers + 1 loop with 2 dividers:
$\theta = \sqrt{(10^4/2\ \pi\ a.b.)^2 + (10^2/2\pi\ a.b.)^2}\ \# \ 10^4/2\ \pi\ a.b.$ 2 loops with 3 dividers each:
$\theta = \sqrt{(10^3/2\ \pi\ a.b.)^2 + (10^3/2\pi\ a.b.)^2} = \sqrt{2}\ 10^3/2\ \pi\ a.b.$ If we assume that three oscillators are being used, the number of solutions increases, the one which gives the minimum time constant consisting of the use of 3 loops with 2 dividers each, whence:

$$\theta = \sqrt{3}\ 10^2/2\ \pi a.b.$$

If we assume six oscillators are being used, we get:

$$\theta = \sqrt{6}\ 10/2\ \pi a.b.$$

FIG. 2 diagrammatically illustrates an increment-multiplier by 1,000 including a first loop with a variable oscillator $0_1$ and a second loop with a variable oscillator $0_2$. The second loop is similar to the second loop in FIG. 1 and operates in the same way for multiplying by a factor 10 the increment $100\epsilon$ which is provided by the first loop. The first loop includes a first increment divider $D_1M_1$ serially connected with a second increment divider $D_{11}M_{11}$. A phase comparator $C_1$ controls the frequency of oscillator $0_1$ to a value $F_1$ such that the frequency at the first input of the phase comparator will equal the frequency $F_0 + \epsilon$ applied to the second input of the phase comparator. It clearly results that $F_1$ will equal $F_0 + 100\epsilon$.

The part of the arrangement described up to now only enables the increment multiplication to be carried out for a single value of the constant term $F_0$ which is sufficient for certain applications of the device.

In practice, in order to be able to work at a wide range of frequencies, an extra phase-locked loop and a frequency synthesizer S will be added thereto.

The extra phase-locked loop comprises an oscillator $0_0$ which generates the frequency $F_0 + \epsilon$, a subtractive mixer $M_0$ and a phase comparator $C_0$.

The frequency synthesizer S is programmed so as to deliver a frequency of the shape $F_0 -$ I, I which is the sum of the increments supplied by the respective decades of the synthesizer being equal to the constant term of the frequency $F_x$ whose increment is to be multiplied.

This frequency $F_x$ is applied to an input of the comparator $C_0$, which receives the beat $\epsilon +$ I coming from the mixer $M_0$ at its other output.

The effect of the working of the extra loop is to cancel out the difference in the phases at the $C_0$ inputs, whence:

$$\epsilon = \Delta$$

In other words, the oscillator $0_n$ finally supplies a frequency $F_0 + 10^n\Delta$ : the increment multiplication has been done at any frequency $F_x$.

It goes without saying that modifications may be made to the devices described and shown, without departing from the scope of the invention. In particular, the coefficient of multiplication could be in the form $k^n$, k being any base.

I claim:

1. Device for multiplying a frequency increment, including at least first and second phase locked loops each comprising a variable oscillator having a frequency control input and an output, a frequency divider with a dividing ratio k, said frequency divider having an input connected to the output of the variable oscillator and an output, additive mixing means having a first input connected to the output of the frequency divider said additive mixing means further having a second input and an output, a phase comparator having a first input connected to the output of the additive mixing means, a second input and an output, the output of the phase comparator being connected to the frequency control input of the variable oscillator, means for applying to the second input of the phase comparator of the first phase locked loop, a frequency comprising a constant term FO and a variable increment, and means for applying, to the second input of each of the additive mixing means, a frequency $k - 1/k$ Fo, the output of the variable oscillator of the first phase locked loop being connected to the second input of the phase comparator of the second phase locked loop.

2. A device as claimed in claim 1, in which at least one of the phase locked loops includes: a variable oscillator having a frequency control input and an output, a plurality of increment dividers serially connected at the output of the variable oscillator, each increment divider comprising a frequency divider with a dividing ratio k and an additive mixer connected in series; and a phase comparator connecting the last increment divider of the plurality to the frequency control input of the variable oscillator, each additive mixer having a second input and means for applying a frequency $k - 1/k$ Fo to said second input.

3. A device as claimed in claim 1, said device further including a further phase locked loop comprising a further variable oscillator having a frequency control input and an output, a substractive mixer having a first input connected to the output of the further variable oscillator, a second input and an output, a frequency synthesizer connected to the second input of the substractive mixer, said frequency synthesizer being programmed for generating a frequency equal to the difference between the said constant term Fo and the constant term of said further frequency, a further phase comparator having a first input connected to the output of the substractive mixer, an output connected to the frequency control input of the further variable oscillator and a second input, means for applying to the second input of the further phase comparator a further frequency comprising a constant term and an increment and means connecting the output of the further variable oscillator to the second input of the phase comparator of the first phase locked loop.

* * * * *